United States Patent
Kwak et al.

(10) Patent No.: US 10,455,408 B2
(45) Date of Patent: Oct. 22, 2019

(54) NETWORK USE METHOD USING VIRTUAL SIM AND APPARATUS THEREFOR

(71) Applicant: SAMSUNG ELECTRONICS CO., LTD., Suwon-si, Gyeonggi-do (KR)

(72) Inventors: Joon Sup Kwak, Seongnam-si (KR); Chunping Gong, Beijing (CN); Hyun Do Lee, Seoul (KR); Jin Koo Kang, Suwon-si (KR); Jin Uk Kang, Yeosu-si (KR); Dong Kyu Kim, Seoul (KR); Jin Wook Kim, Seongnam-si (KR); Hyun Jung Baek, Hwaseong-si (KR); Ji Ho Shin, Cheongju-si (KR); Sung Taek Lee, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 2 days.

(21) Appl. No.: 15/609,489

(22) Filed: May 31, 2017

(65) Prior Publication Data
US 2017/0347259 A1    Nov. 30, 2017

(30) Foreign Application Priority Data

May 31, 2016 (CN) .......................... 2016 1 0374445
Jun. 23, 2016 (KR) ........................ 10-2016-0078443

(51) Int. Cl.
| | |
|---|---|
| H04W 4/60 | (2018.01) |
| H04W 4/50 | (2018.01) |
| H04W 8/18 | (2009.01) |
| H04M 15/00 | (2006.01) |
| H04W 64/00 | (2009.01) |

(Continued)

(52) U.S. Cl.
CPC ....... *H04W 8/183* (2013.01); *H04M 15/8038* (2013.01); *H04M 17/02* (2013.01); *H04W 4/24* (2013.01); *H04W 4/50* (2018.02); *H04W 4/60* (2018.02); *H04W 8/205* (2013.01);
(Continued)

(58) Field of Classification Search
CPC ......... H04W 4/00; H04W 4/02; H04W 4/021; H04W 4/022; H04W 4/203; H04W 4/30; H04W 4/50; H04W 4/60
See application file for complete search history.

(56) References Cited

U.S. PATENT DOCUMENTS

| | | |
|---|---|---|
| 8,555,067 B2 | 10/2013 | Schell et al. |
| 8,811,969 B2 | 8/2014 | Shi et al. |

(Continued)

FOREIGN PATENT DOCUMENTS

| | | |
|---|---|---|
| KR | 10-2012-0021186 | 3/2012 |
| KR | 10-2014-0013102 | 2/2014 |

*Primary Examiner* — San Htun
(74) *Attorney, Agent, or Firm* — Nixon & Vanderhye P.C.

(57) ABSTRACT

An electronic device is provided. The electronic device includes a processor configured to execute a roaming application, a communication circuit configured to enable a first subscriber identity module (SIM) and to communicate with a network based on the first SIM, and a memory configured to store data associated with the roaming application. The processor is further configured to, when a roaming service product is selected in the roaming application, download a second SIM corresponding to the roaming service product from a server and enable an activation menu of the roaming service product included in the roaming application, based on location information of the electronic device.

7 Claims, 10 Drawing Sheets

(51) Int. Cl.
*H04W 4/24* (2018.01)
*H04W 12/06* (2009.01)
*H04W 8/20* (2009.01)
*H04M 17/02* (2006.01)
*H04W 88/06* (2009.01)

(52) U.S. Cl.
CPC ........... H04W 12/06 (2013.01); H04W 64/00 (2013.01); H04W 88/06 (2013.01)

(56) References Cited

U.S. PATENT DOCUMENTS

| | | | | |
|---|---|---|---|---|
| 9,357,378 B1* | 5/2016 | Delker | .................. | H04W 4/001 |
| 2006/0183477 A1* | 8/2006 | Bocking | ............... | H04W 48/18 |
| | | | | 455/435.2 |
| 2010/0056102 A1* | 3/2010 | Chan | ....................... | H04L 12/14 |
| | | | | 455/406 |
| 2010/0311468 A1* | 12/2010 | Shi | ........................ | H04W 4/001 |
| | | | | 455/558 |
| 2012/0108207 A1 | 5/2012 | Schell et al. | | |
| 2013/0023235 A1* | 1/2013 | Fan | ........................ | H04W 48/18 |
| | | | | 455/411 |
| 2013/0102306 A1* | 4/2013 | Sachanandani | ..... | H04L 63/0853 |
| | | | | 455/432.2 |
| 2013/0225239 A1* | 8/2013 | Wu | ................... | H04M 1/72519 |
| | | | | 455/558 |
| 2014/0099916 A1* | 4/2014 | Mallikarjunan | ........ | H04W 8/20 |
| | | | | 455/406 |
| 2014/0099925 A1 | 4/2014 | Schell et al. | | |
| 2015/0312698 A1 | 10/2015 | Schell et al. | | |
| 2016/0007190 A1* | 1/2016 | Wane | ..................... | H04W 4/50 |
| | | | | 455/419 |
| 2016/0029204 A1* | 1/2016 | Lalwaney | ............... | H04W 8/22 |
| | | | | 455/418 |
| 2016/0205527 A1* | 7/2016 | Hui | ....................... | H04W 4/021 |
| | | | | 455/404.2 |
| 2016/0227409 A1 | 8/2016 | Schell et al. | | |

\* cited by examiner

NETWORK USE METHOD USING VIRTUAL SIM AND APPARATUS THEREFOR

CROSS-REFERENCE TO RELATED APPLICATIONS

This application is based on and claims priority under 35 U.S.C. § 119 to a Chinese patent application filed on May 31, 2016, in the State Intellectual Property Office of the P.R.C. and assigned Serial number 201610374445.5 and to a Korean patent application filed on Jun. 23, 2016 in the Korean Intellectual Property Office and assigned Serial number 10-2016-0078443, the disclosures of each of which are incorporated by reference herein in their entireties.

TECHNICAL FIELD

The present disclosure relates generally to technologies for purchasing and using a subscriber identity module (SIM) corresponding to a specific area in an electronic device.

BACKGROUND

To receive network-based services, electronic devices, such as smartphones, tablets, and smartwatches, may access a cellular network or may use a wireless network such as wireless-fidelity (Wi-Fi). For an electronic device to use a network provided by a mobile network operator (MNO), a subscriber identity module (SIM) corresponding to the MNO should be loaded and enabled.

If a user of a first country moves to a second country (a foreign country), in general, a user of an electronic device may use network resources provided by an MNO (Mobile Network Operator) of the second country using a roaming service. Alternatively, the user of the electronic device may purchase a pre-paid SIM in the second country and may load and enable the pre-paid SIM into the electronic device, thus using network resources of the second country.

However, if a roaming service is used, undue economic burden may occur. For example, an amount of money corresponding to a usage charge for 1 month in the first country may be similar to an amount of money of using a roaming service used for 1 week in the second country. Further, if a pre-paid SIM is used, it is difficult or inconvenient for the user to purchase a pre-paid SIM compatible in his or her electronic device locally (in the second country).

SUMMARY

Example aspects of the present disclosure address at least the above-mentioned problems and/or disadvantages and to provide at least the advantages described below. Accordingly, an example aspect of the present disclosure is to provide a method for enabling a virtual SIM after a user downloads the virtual SIM to an electronic device anywhere and authenticates and pays for the virtual SM and using a network service using the virtual SIM.

In accordance with an example aspect of the present disclosure, an electronic device is provided. The electronic device may include a processor configured to execute a roaming application, a communication circuit configured to enable a first subscriber identity module (SIM) and communicate with a network based on the first SIM, and a memory configured to store data associated with the roaming application. The processor may be further configured to, when a roaming service product is selected in the roaming application, download a second SIM corresponding to the roaming service product from a server and enable an activation menu of the roaming service product included in the roaming application, based on location information of the electronic device.

In accordance with another example aspect of the present disclosure, a method using a network by an electronic device is provided. The method may include executing a roaming application by the electronic device using a first SIM, downloading a second SIM in response to selection of a roaming service product in the roaming application, and enabling an activation menu of the roaming service product included in the roaming application, based on location information of the electronic device.

In accordance with another example aspect of the present disclosure, a non-transitory computer readable medium is provided. The non-transitory computer readable medium may include instructions, which when executed by a processor of an electronic device using a first SIM, causes the electronic device to perform at least one operation comprising execute a roaming application stored in the medium, download a second SIM in response to selection of a roaming service product in the roaming application, and enable an activation menu of the roaming service product included in the roaming application, based on location information of the electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein.

DETAILED DESCRIPTION

Figure 1:
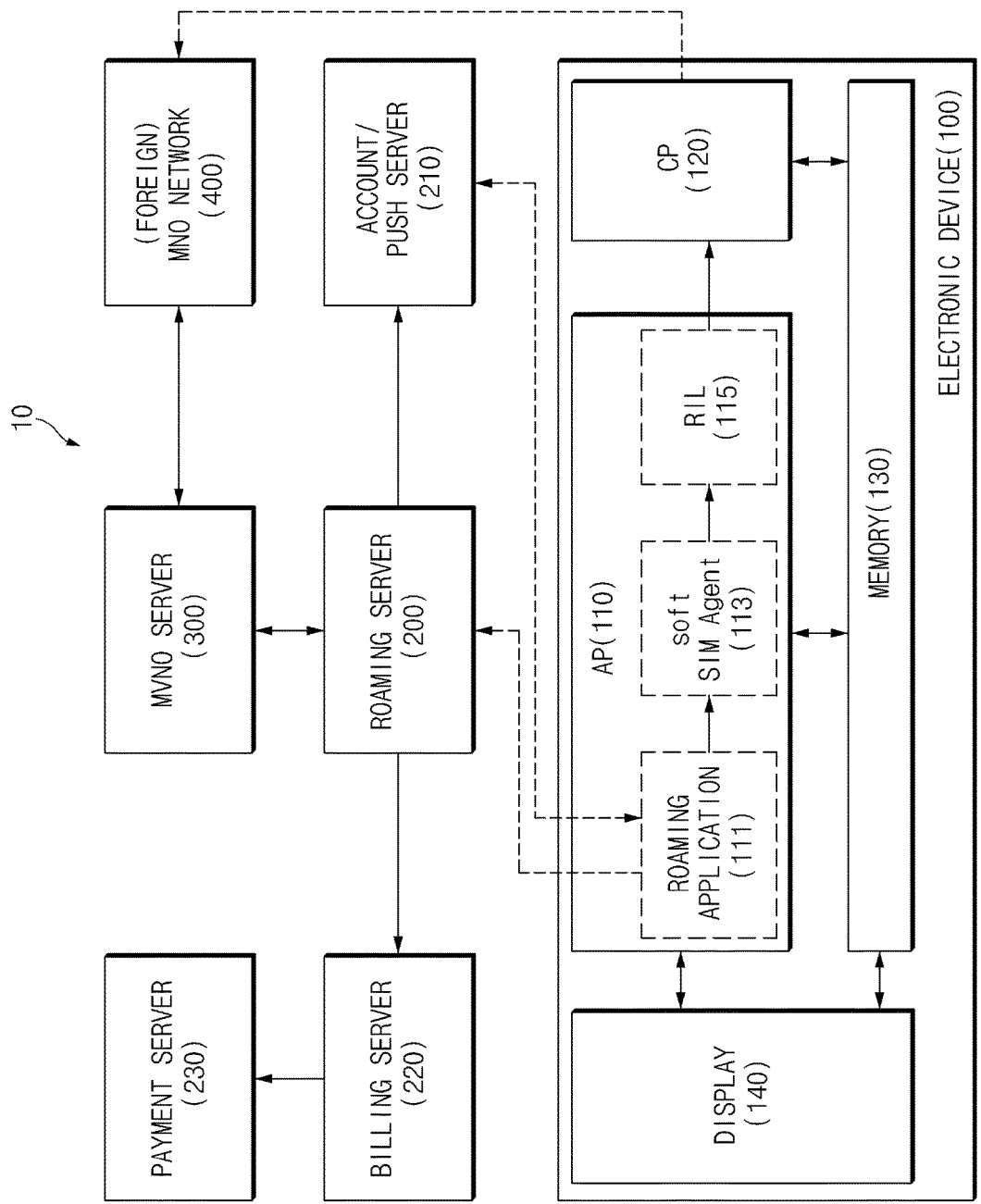
FIG. 1 is a block diagram illustrating an example virtual SIM payment/authentication system according to an example embodiment.

Hereinafter, various example embodiments of the present disclosure may be described with reference to accompanying drawings. Accordingly, those of ordinary skill in the art will recognize that various modifications, equivalents, and/or alternatives of the various example embodiments described herein may be made without departing from the scope and spirit of the present disclosure. With regard to description of drawings, similar elements may be marked by similar reference numerals.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. On the other hand, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may refer to a situation in which the device is "capable of" operating together with another device or other components. For example, a "processor configured to (or set to) perform A, B, and C" may refer, for example, to a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices, or the like, but is not limited thereto. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit), or the like, but is not limited thereto.

Hereinafter, electronic devices according to various example embodiments will be described with reference to the accompanying drawings.

FIG. 1 is a block diagram illustrating an example virtual SIM payment/authentication system according to an example embodiment.

A virtual SIM payment/authentication system 10 may include an electronic device 100, a roaming server 200, an account/push server 210, a billing server 220, a payment server 230, a mobile virtual network operator (MVNO) server 300, and a (foreign) mobile network operator (MNO) network 400.

In the present disclosure, a virtual SIM may refer to a SIM installed in a storage (e.g., a memory 130 or an embedded secure element (eSE)) of the electronic device 100 depending on a software scheme, rather than a SIM of a physical hardware form. Thus, the virtual SIM may be referred to as a soft(ware) SIM.

The electronic device 100 may be a mobile device used by its user. The electronic device 100 may be referred to as a mobile device, a mobile terminal, user equipment (UE), or the like.

The electronic device 100 may include an application processor (e.g., including processing circuitry) 110, a communication processor (e.g., including communication and/or processing circuitry) 120, a memory 130, and a display 140. The electronic device 100 may further include an additional element other than the elements shown in FIG. 1. For example, the electronic device 100 may further include a touch integrated circuit (IC), a camera, a microphone, a speaker, a variety of sensors, and the like.

The AP 110 may include various processing circuitry and/or program elements that perform a function of controlling elements of the electronic device 100. The AP 110 may be generally referred to as a processor. In an embodiment, the AP 110 may support a trusted execution environment (TEE) and a rich execution environment (REE), such as ARM® TrustZone® technology, which are independent of each other. For example, in case of TrustZone®, the TEE may be called a secure world, and the REE may be called a normal world. However, the TEE/REE may be referred to as another tile such as a secure/normal mode or a secure operation environment/normal operation environment.

The TEE may provide high-level security and may block access of an application which is not executed in the TEE or may grant access of the application on a limited basis. For example, when a payment application executed in the REE wants to perform payment, it may request the TEE to perform authentication. An authentication application executed in the TEE may obtain authentication information such as a fingerprint of a user, may compare the obtained authentication information with data stored in a secure memory area, and may provide only a result value indicating authentication success/failure to the payment application which is being executed in the REE.

The AP 110 may drive a roaming application 111, a soft SIM agent 113, and a radio interface layer (RIL) 115. In addition, the AP 110 may drive various applications, an application framework, various managers, an operating system (OS), and the like.

The roaming application 111 may include various program elements and provide a service and setting associated with a communication function of the electronic device 100. For example, when the user wants to use the electronic device 100, purchased in a first country, in a second country, he or she may execute the roaming application 111 and may perform a roaming setting. Further, in an embodiment, the user may execute the roaming application 111 and may order a roaming service produce available in the second country.

If the roaming service produce is ordered in the electronic device 100, the electronic device 100 may receive a SIM profile corresponding to the roaming service product from a server and may store the received SIM profile in the memory 130 or a secure area such as the eSE. Information, such as an international mobile subscriber identity (IMSI), for identifying and authenticating the user may be included in the SIM profile. Thus, a process of downloading and storing the SIM profile may be mainly performed in the TEE.

The soft SIM agent 113 may include various program elements and provide a communication interface between a trusted application (TA) operated in the TEE and the RIL 115. For example, the soft SIM agent 113 may request the TEE to transmit information corresponding to an event generated in the roaming application 111. For example, if an event in which a currently enabled first SIM is replaced with a second SIM is generated in the roaming application 111, the soft SIM agent 113 may request a soft SIM TA operated in the TEE to transmit authentication information for authenticating a network corresponding to the second SIM. The authentication information may include, for example, a subscriber key (Ki), an operator constant (OPc), an IMSI value, and the like, corresponding to the second SIM. If the authentication information is received from the TEE, the soft SIM agent 113 may provide the received authentication information to the CP 120 via the RIL 115. The TEE and the CP 120 may communicate data over a secure channel. For example, an application protocol data unit (APDU) message exchanged between the soft SIM TA and the CP 120 may be transmitted over a secure channel between the AP 110 and the CP 120.

The CP 120 may include various processing and/or communication circuitry and perform a cellular communication function between the electronic device 100 and a network.

The CP 120 may be generally referred to as a communication circuit. The CP 120 may communicate with a network based on a command or information of the AP 110, transmitted via the RIL 115.

Instructions, a programmable code, or the like for executing operations performed in the electronic device 100 in embodiments disclosed in the present disclosure may be stored in the memory 130. For example, data associated with the roaming application 111 (e.g., a source file for executing the roaming application 111, a user data file, or the like) may be stored in the memory 130.

A partial area of the memory 130 may be designated as a secure area by the AP 110. For example, the AP 110 may designate a partial area of the memory 130 as a secure area accessible in only the TEE. In an embodiment, the AP 110 may store a virtual SIM obtained from the roaming server 200 in a secure area of the memory 130. In another embodiment, if the electronic device 100 uses an eSE as a storage of a soft SIM, a virtual SIM may be stored in the eSE.

A user interface (UI) of the roaming application 111 may be displayed on the display 140. If the display 140 includes a structure (e.g., a touch screen panel TSP) for receiving a user input (e.g., a touch input), the display 140 may perform a function of receiving the user input.

The roaming server 200 may correspond to a server which provides a roaming service product according an embodiment. The roaming server 200 may be understood as a content provider of the roaming application 111. For example, a roaming service product purchasable through the roaming application 111 may correspond to a product registered in the roaming server 200.

The account/push server 210 may perform a function of managing a user account necessary for using the roaming application 111 and processing a push notification provided to the roaming application 111.

The billing server 220 may refer, for example, to a server which manages payment information when a roaming service produce is purchased. Further, the payment server 230 may perform a function of receiving payment information from the billing server 220 and approving or denying payment. The payment server 230 may correspond to a payment gateway server or a server of a financial institution such as a bank or a card issuer.

The roaming server 200 may be operated by a manufacturer of the electronic device 100 or a company which has a cooperative relationship or a partnership with the manufacturer. Further, in an embodiment, the roaming server 200, the account/push server 210, and the billing server 220 may be operated by independent business entities or may be operated by one business entity (e.g., the manufacturer of the electronic device 100). In the latter instance, elements of a system displayed as two or more servers in FIG. 1 may be implemented to be integrated into one server.

The MVNO server 300 may refer, for example, to a server which has a business partner relationship with an operator of the roaming server 200 and serves a SIM corresponding to a plurality of countries or areas. For example, the MVNO server 300 may provide a virtual SIM which may use operator networks (e.g., the network 400) of several countries such as AT&T (US), T-mobile (Germany), and Orange (France).

A user who purchases a roaming service product in the roaming application 111 and accesses a network through a product purchased in a foreign country may have the same user experience as using a conventional roaming service. However, in fact, the user may purchase a (virtual) SIM of the country by purchasing a roaming service product and may receive a network service in the country using the purchased SIM. Thus, the user may have the same user experience as the conventional roaming service at a lower price than the conventional roaming service through a more simplified purchase procedure than a procedure using the conventional roaming service.

Hereinafter, a description will be given of a method for purchasing a roaming service product, enabling the purchased roaming service product, and using the purchased roaming service product.

Figure 2:
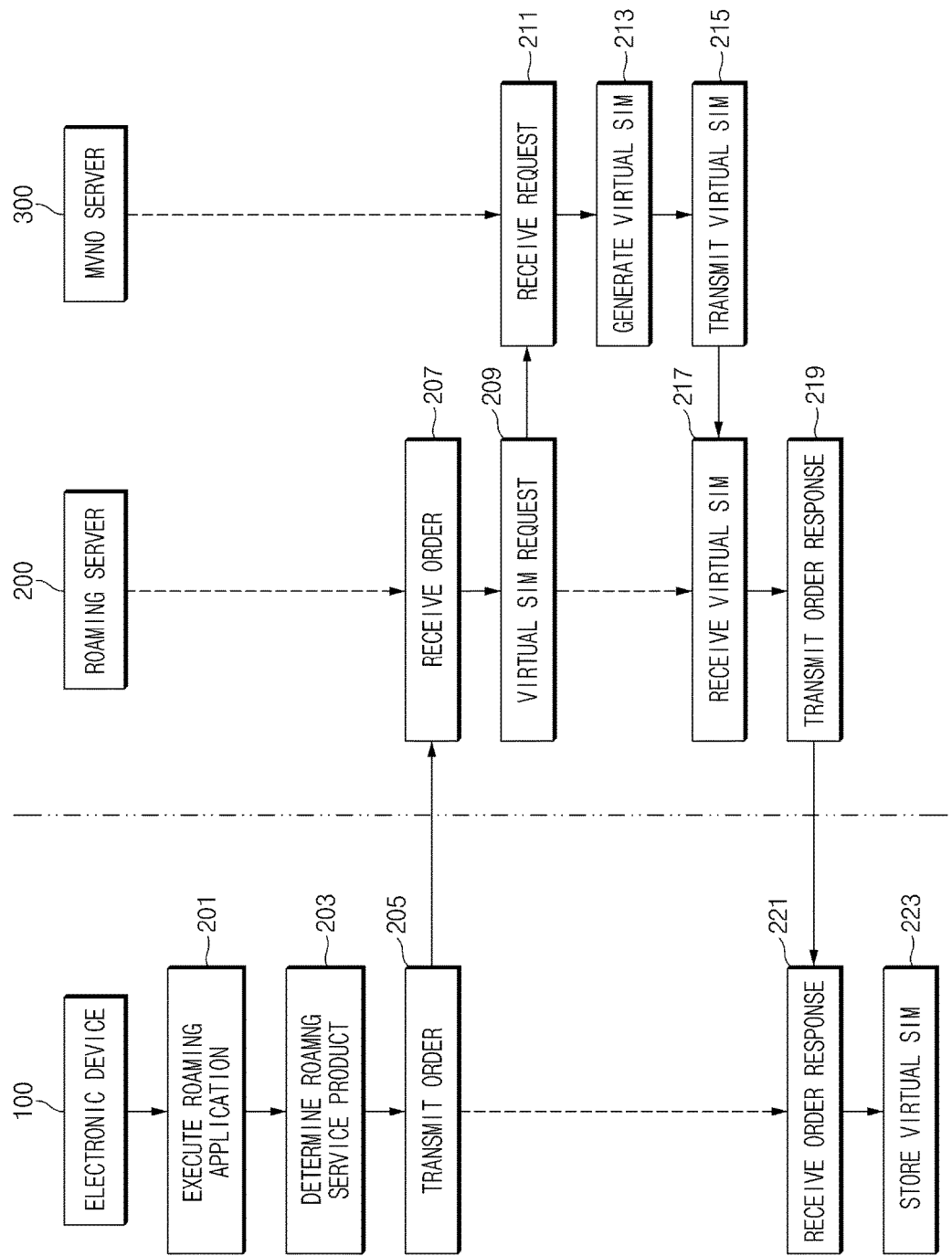
FIG. 2 is a sequence diagram illustrating an example purchase process of a roaming service product according to an example embodiment.

FIG. 2 is a sequence diagram illustrating an example purchase process of a roaming service product according to an example embodiment.

Referring to FIG. 2, in operation 201, an electronic device 100 may execute a roaming application 111 of FIG. 1. If the roaming application 111 is executed, a screen where the roaming application 111 is executed may be displayed on a display 140 of the electronic device 100. The screen where the roaming application 111 is executed may include a plurality of roaming service products purchasable by a user of the electronic device 100.

In operation 203, the electronic device 100 may determine at least one roaming service product. For example, the electronic device 100 may determine a roaming service product selected by a user input among the plurality of roaming service products as a roaming service product to be purchased.

In operation 205, the electronic device 100 may transmit an order for the selected roaming service product. For example, the electronic device 100 may transmit an order for a roaming service product for providing a data service for two days in Hong Kong to a roaming server 200. The order for the roaming service product may include information necessary for generating subscriber identification information (e.g., an international mobile subscriber identity (IMSI) or the like) for using a network of a country and/or a mobile network operator (MNO) to which the roaming service product is applied. Identification information of the electronic device 100, user information of the electronic device 100, or the like may be included in the order for the roaming service product. For convenience of description, subscriber identification information in the present disclosure may be simply referred to as an IMSI.

In operation 207, the roaming server 200 may receive the order. In operation 209, the roaming server 200 may request an MVNO server 300 to transmit a virtual SIM. The roaming server 200 may include terminal/user information necessary for generating an IMSI in a request message. Further, information about an encryption means (e.g., a public key) for ensuring security of the IMSI may be included in the request message.

In operation 211, the MVNO server 300 may receive the virtual SIM request. In operation 213, the MVNO server 300 may generate an IMSI based on information included in the virtual SIM request. The IMSI may be generated in a state where it is encrypted. In operation 215, the MVNO server 300 may transmit the virtual SIM to the roaming server 200.

In operation 217, the roaming server 200 may receive the virtual SIM. In operation 219, the roaming server 200 may transmit a response message to the order to the electronic device 100. (Encrypted) IMSI information may be included in the response message.

In operation 221, the electronic device 100 may receive the transmitted response message to the order. In operation 223, the electronic device 100 may store a virtual SIM (or an IMSI) included in the response message in a memory 130 of FIG. 1. The electronic device 100 may store the IMSI in a separate storage in which security is ensured, for example, a secure area of the memory 130 or an eSE.

Figure 3:
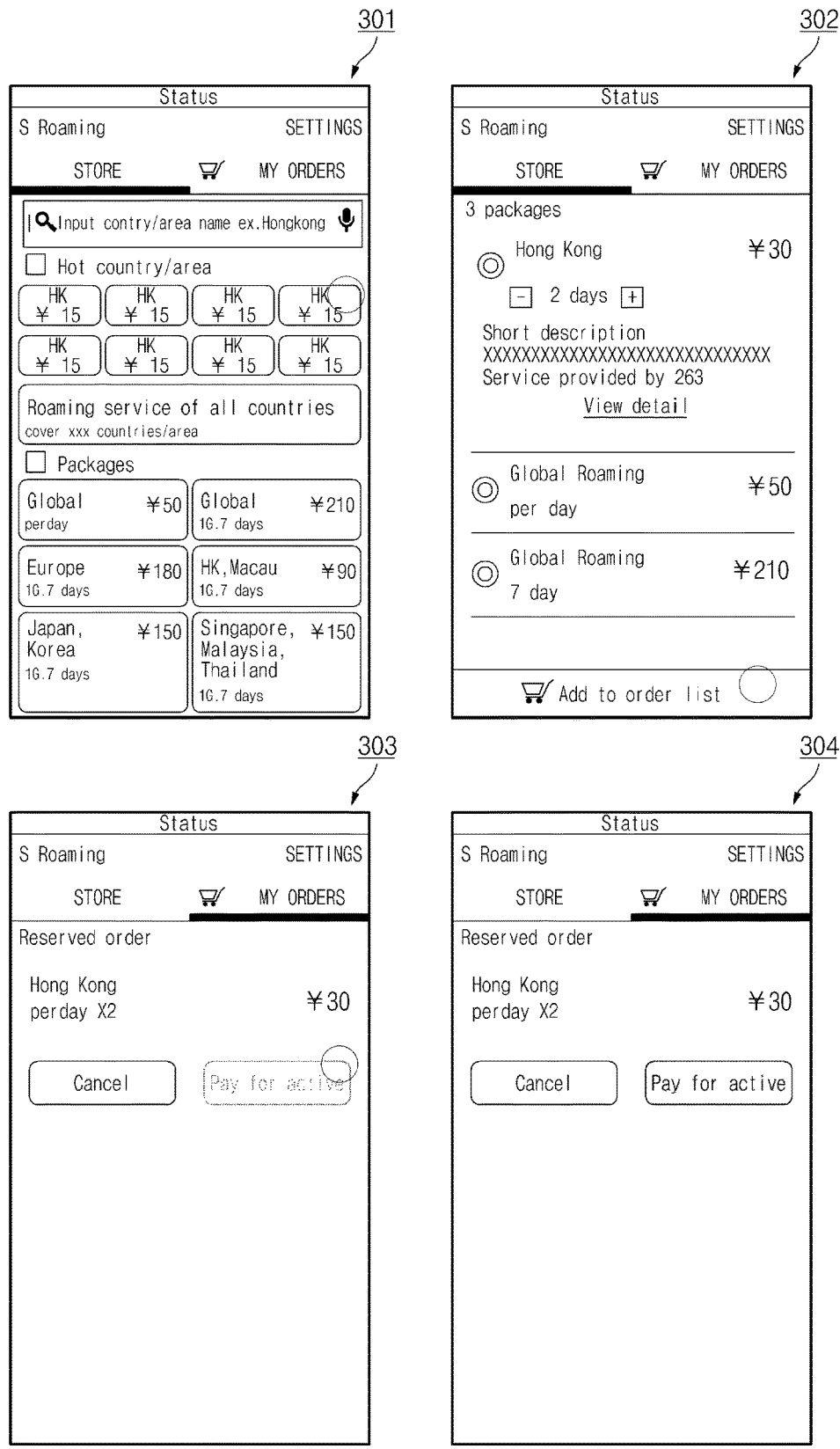
FIG. 3 is a diagram illustrating an example user interface (UI) associated with purchasing a roaming service produce according to an example embodiment.

FIG. 3 is a diagram illustrating an example UI associated with purchasing a roaming service produce according to an example embodiment.

Referring to FIG. 3, screen 301 may indicate a plurality of roaming service products purchasable through a roaming application 111 of FIG. 1. Screen 301 may be displayed when, for example, operation 201 of FIG. 2 is performed.

The plurality of roaming service products may be arranged in the form of recommended countries or packages. In an embodiment, an electronic device 100 of FIG. 1 may obtain schedule information of its user from another application (e.g., a calendar application) stored in the electronic device 100 or a user account server (e.g., a cloud server, an account/push server 210 of FIG. 1, or the like). The electronic device 100 may recommend a roaming service product suitable for a country, an area, a visit schedule, or the like to be visited by the user, based on the obtained schedule information.

Screen 302 may indicate a screen for adding a specific roaming service product to an order list. Screen 302 may be displayed when operation 203 of FIG. 2 is performed. If an "Add to order list" menu is selected on screen 302, the electronic device 100 may perform operation 205 of FIG. 2.

Screen 303 may indicate a state where a roaming service product is added to the order list or is not enabled. Screen 303 may be displayed after operation 221 of FIG. 2 is performed.

In an embodiment, if the user orders a roaming service product, available in a second country, in a first country, a "pay for active" menu for enabling the roaming service product may fail to be enabled before he or she moves to the second country. If the user moves to the second country, the "pay for active" menu may be enabled on screen 304. A description will be given of a process associated with this with reference to FIG. 4.

Figure 4:
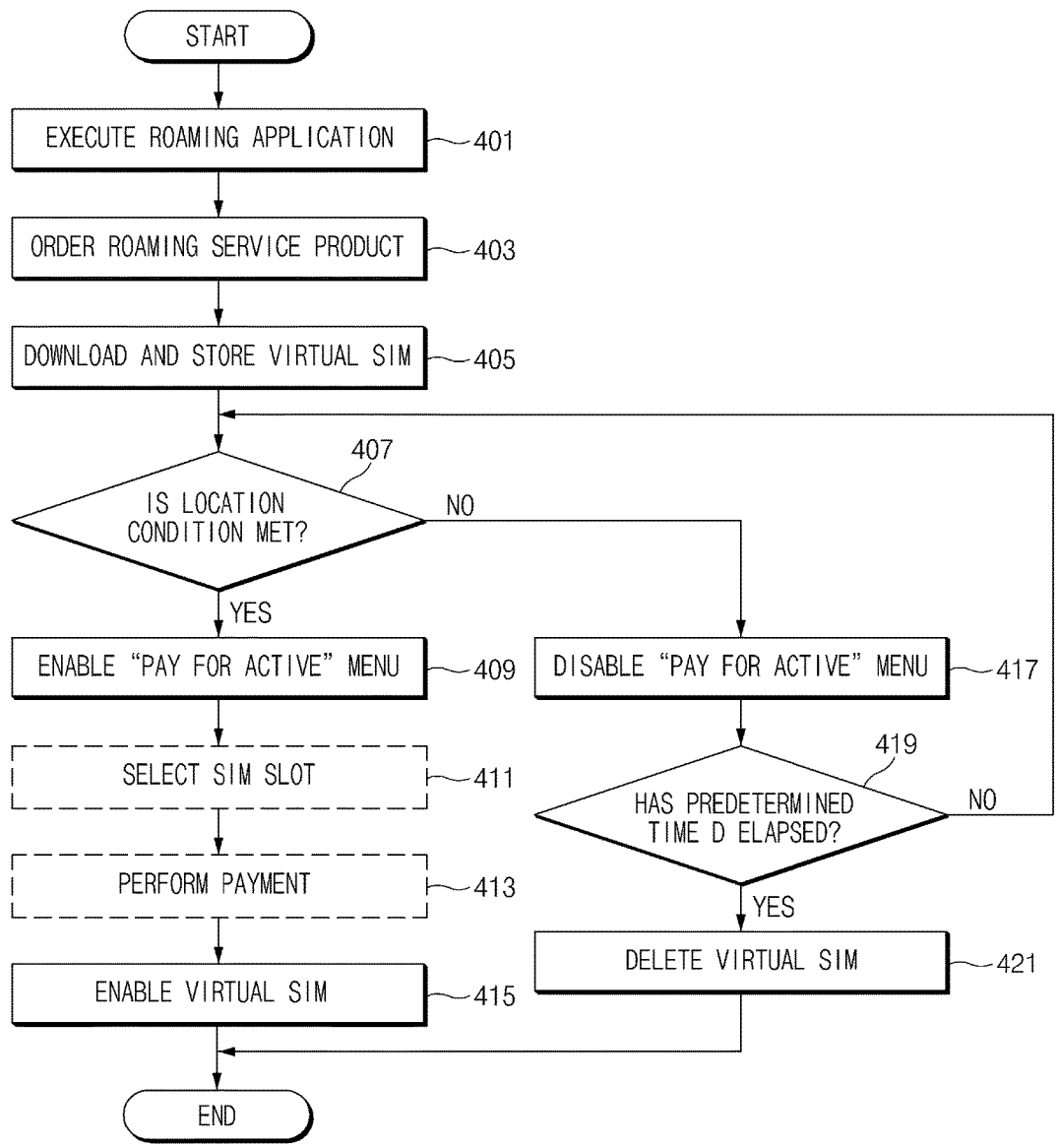
FIG. 4 is a flowchart illustrating an example process for enabling a "pay for active" menu for a roaming service product according to an example embodiment.

FIG. 4 is a flowchart illustrating an example process for enabling a "pay for active" menu for a roaming service product according to an example embodiment.

Referring to FIG. 4, in operation 401, an electronic device 100 of FIG. 1 may execute a roaming application 111 of FIG. 1. Operation 401 may correspond to operation 201 of FIG. 2. In an embodiment, the roaming application 111 may be of a form of a separate independent application, but may be implemented as one (e.g., a roaming setting menu) of setting items of the electronic device 100.

In operation 403, an order for a roaming service product may be performed. Operation 403 may correspond to operations 203 and 205 of FIG. 2. In operation 405, a second SIM (a virtual SIM) may be downloaded from a roaming server 200 of FIG. 1, and the electronic device 100 may store the downloaded second SIM (virtual SIM) in a memory 130 of FIG. 1 or the like.

Operations 401 to 405 may be performed when the electronic device 100 is located in a first country. For example, a user of the electronic device 100 may purchase a roaming service product to be used in a second country when located in the first country (e.g., a home country). In this case, a CP 120 of the electronic device 100 may be in a state where a first SIM available in the first country is enabled. When performing operations 401 to 405, the electronic device 100 may use a network provided from an MNO corresponding to the first SIM.

Operations 407 to 415 may be performed when the electronic device 100 is located in a second country. Operation 407, the electronic device 100 may determine whether a location condition is met. In other words, in case of the above example, the electronic device 100 may determine whether it is currently located in the second country.

Location information of the electronic device 100 may be obtained in various methods. For example, a cellular communication circuit of the electronic device 100 may perform a network search to obtain public land mobile network (PLMN) information. Since the PLMN information includes mobile country code (MCC) and mobile network code (MNC) information, the electronic device 100 may obtain information, about a country where the electronic device 100 is currently located and an MNO available by the electronic device 100, and the like based on the MCC and MNC information. If an MCC of the second country included in the second SIM or country information selected when the user purchases a roaming service product is identical to an MCC obtained through a network search, the electronic device 100 may determine that location information of the electronic device 100 is meet in operation 407.

In another example, the electronic device 100 may include a GPS signal receiving circuit (or a GPS module). In this case, the electronic device 100 may determine its location information based on a GPS signal received via the GPS signal receiving circuit. If the determined location information corresponds to an MCC included in the second SIM, the electronic device 100 may determine that the location information of the electronic device 100 is met in operation 407. In an embodiment, to enhance accuracy of location information, the above two methods may be combined and used or another positioning algorithm known to those skilled in the art may be additionally or alternatively used.

If the location condition is met, in operation 409, a "pay for active" menu may be enabled. In this case, screen 304 of FIG. 3 may be displayed on a display 140 of the electronic device 100.

If the enabled "pay for active" menu is selected, in operation 411, a procedure for selecting a SIM slot may be performed. Operation 411 may be performed if the electronic device 100 supports two or more SIMs. If the electronic device 100 supports to enable only one SIM, operation 411 may be omitted. A description will be given of a detailed operation of operation 411 with reference to FIG. 5.

In operation 413, the electronic device 100 may perform payment for the ordered roaming service product. For example, the electronic device 100 may register billing information such as a credit card or may transmit payment information about a roaming service product to the roaming server 200 using the registered payment information. The roaming server 200 may provide the payment information to a payment server 230 of FIG. 1 via a billing server 220 of FIG. 1 and may provide a response to the payment to the electronic device 100.

If the payment is completed, in operation 415, a CP 120 of the electronic device 100 may enable a second SIM (a virtual SIM) and may access a network of an MNO of the second country using the second SIM. For example, if operation 415 is performed in a state where the first SIM is enabled, the CP 120 may disable the first SIM and may enable the second SIM. In connection with an authentication and payment procedure of the second SIM, a description will be given in detail with reference to FIG. 6.

If the location condition is not met, in operation 417, the electronic device 100 may disable the "pay for active" menu or may maintain a state where the "pay for active" menu is disabled. In operation 419, the electronic device 100 may determine whether a predetermined time D (e.g., 7 days) has elapsed in a state where the "pay for active" menu is not enabled. For example, if the constant time D elapses, in operation 421, the electronic device 100 may delete a virtual SIM. In this case, although the roaming application 111 is executed, a roaming service product ordered by the user may be in a state where it is cancelled. Further, the roaming server 200 or the MVNO server 300 may delete an issued IMSI value if it is determined that the constant time D elapses after a virtual SIM is issued.

Figure 5:
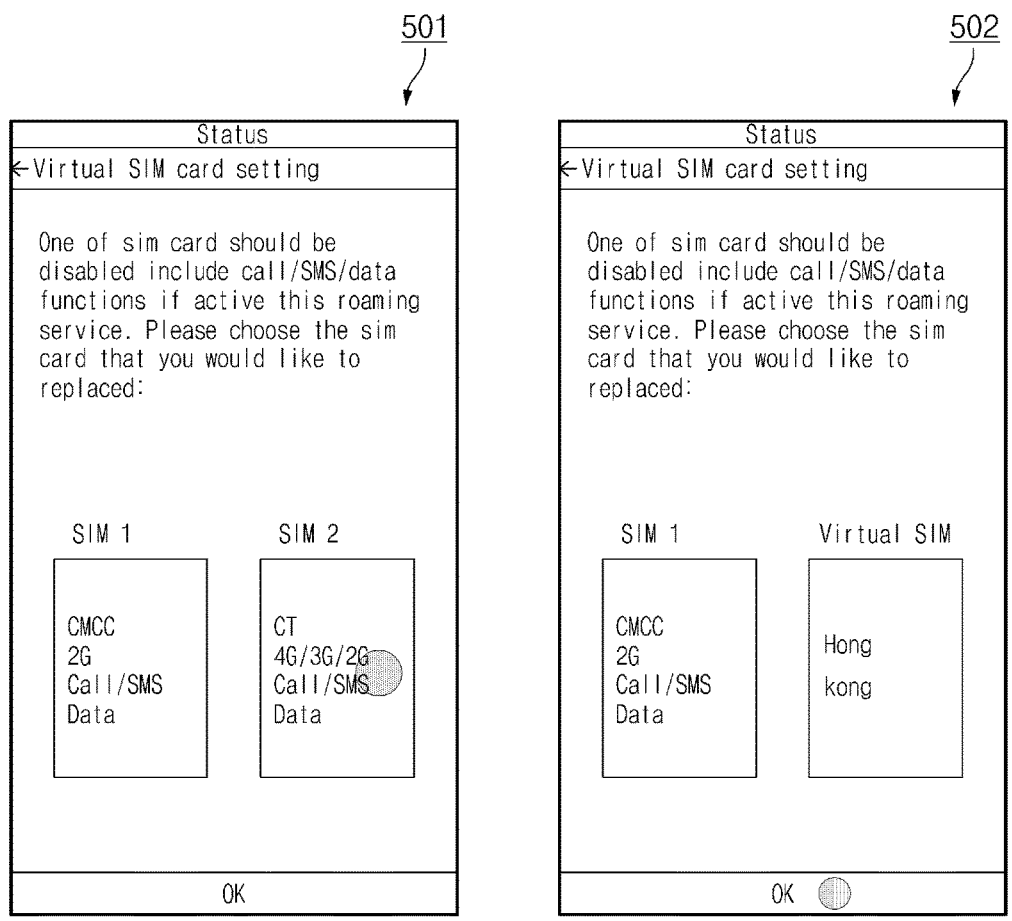
FIG. 5 is a diagram illustrating an example screen for selecting a SIM slot according to an example embodiment.

FIG. 5 is a diagram illustrating an example screen for selecting a SIM slot according to an example embodiment.

If an electronic device 100 of FIG. 1 supports to enable two or more SIMs, screen 501 may be displayed. For example, when an enabled "pay for active" menu is selected on a screen where a roaming application 111 of FIG. 1 is executed, screen 501 may provide a UI for selecting a SIM slot to load a SIM corresponding to a purchased roaming service product. Since the SIM corresponding to the roaming service produce is a virtual SIM (a software SIM) actually rather than a physical SIM, screen 501 may be understood as a screen for selecting a SIM disabled to use the virtual SIM.

For example, screen 510 may indicate a state where a China mobile communications corporation (CMCC) SIM is enabled on a first SIM slot SIM 1 and a state where a China telecom (CT) SIM is enabled on a second SIM slot (SIM 2). The electronic device 100 may use a voice call and a short message service (SMS) using a second generation (2G) network of CMCC through a SIM enabled on the first SIM slot. Further, the electronic device 100 may use a voice call/SMS using a fourth generation (4G) network (data/voice) and a 2G/3G network of CT through the SIM enabled on the second SIM slot. If the second SIM slot is selected by a user input or the like on screen 501, on screen 502, a CMCC SIM may be maintained on the first SIM slot and a second SIM purchased to be used in Hong Kong may be enabled on the second SIM slot. For example, a user may use a voice call service based on a first SIM (e.g., the CMCC SIM) and may use a data service based on the second SIM (e.g., a virtual SIM of Hong Kong), in a foreign country. In this case, a third SIM (e.g., a CT SIM) replaced by the second SIM may be disabled. In an embodiment, if location information of the electronic device 100 does not correspond to the second SIM any longer (e.g., if the electronic device 100 gets out of Hong Kong and moves to another country or a mother country), the electronic device 100 may automatically disable the second SIM and may enable the third SIM again.

Figure 6:
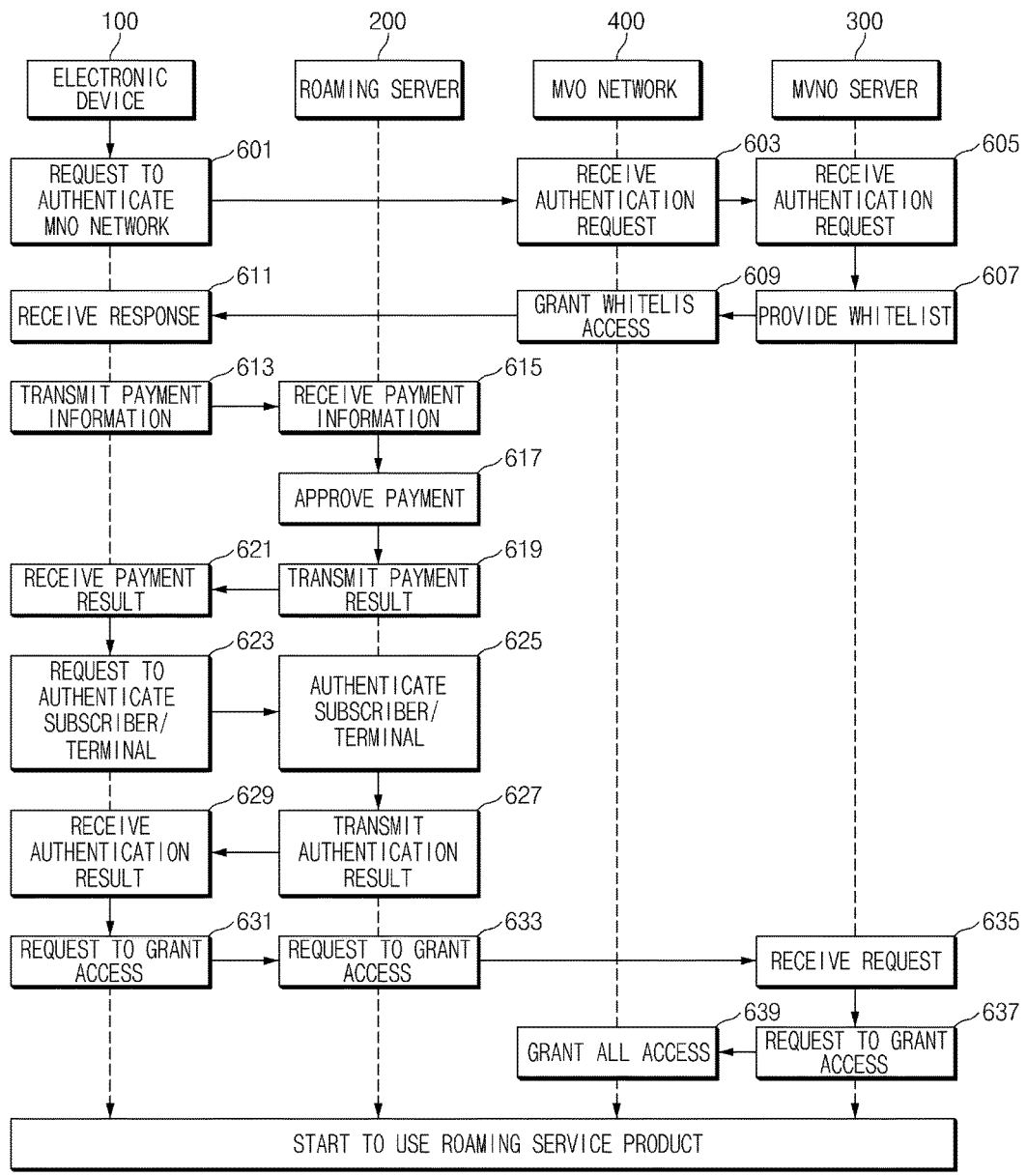
FIG. 6 is a sequence diagram illustrating an example network activation process using a virtual SIM according to an example embodiment.

FIG. 6 is a sequence diagram illustrating an example network activation process using a virtual SIM according to an example embodiment.

A process of FIG. 6 may be understood as a detailed process of operations 411 to 415 of FIG. 4. Further, the process of FIG. 6 may be performed after any one SIM slot is selected on a screen 502 of FIG. 5.

In operation 601, an electronic device 100 may request to authenticate an MNO network 400. For example, if the electronic device 100 is located in a second country, it may attempt to access the MNO network 400 of the second country. In this case, the electronic device 100 may transmit information (e.g., an IMSI, an authentication key, a Ki) of a second SIM to the MNO network 400. In FIG. 6, the MNO network 400 may be understood as a base station or a server which manages an MNO network.

In operation 603, the MNO network 400 may receive the authentication request and may transmit the authentication request to an MVNO server 300. Receiving the authentication request in operation 605, in operation 607 the MVNO server 300 may provide a whitelist accessible by the electronic device 100 to the MNO network 400 based on the IMSI and the like. A domain list of a server (e.g., a roaming server 200, a billing server 220, or a payment server 230 of FIG. 1) and the like which should be accessed to perform payment or authentication before the electronic device 100 completes the payment or authentication for the second SIM may be included in the whitelist. In operation 609, the MNO network 400 may transmit a response indicating that access of the whitelist is granted to the electronic device 100.

In operation 611, the electronic device 100 may receive the response to the whitelist from the MNO network 400. In operation 613, the electronic device 100 may transmit payment information about an ordered roaming service product to the roaming server 200. A variety of information such as a country, a period of time, data, usage, and a payment means of a selected roaming service product may be included in the payment information.

In an embodiment, the payment information may be directly transmitted to the billing server 220, and a result of processing payment may be transmitted via the roaming server 200. In FIG. 6, an embodiment is exemplified as the payment related operation is performed by the roaming server 200. However, a payment procedure may be completed through communication among the roaming server 200, the billing server 220, and the payment server 230.

In operation 615, the roaming server 200 may receive the payment information. If payment is approved in operation 617, in operation 619, the roaming server 200 may transmit the payment result to the electronic device 100. In FIG. 6, for convenience of description, a payment denial due to omission, a mismatch, or the like may fail to be considered.

In operation 621, the electronic device 100 may receive the payment result from the roaming server 200. In operation 623, the electronic device 100 may request the roaming server 200 to authenticate a subscriber and/or a terminal (the electronic device 100).

In operation 625, the roaming server 200 may determine whether a user/terminal which purchases a roaming service product using a variety of secure means included in the request to authenticate the subscriber terminal is an authorized user/terminal. In the present disclosure, a description about if a terminal is stolen by a malicious user or if a user of the terminal is used illegally by the malicious user will be omitted below.

Further, in FIG. 6, an embodiment is exemplified as the subscriber/terminal authentication process is performed after the payment process. However, the subscriber/terminal authentication process may be first performed, or the payment process and the subscriber/terminal authentication process may be simultaneously performed.

In operation 627, the roaming server 200 may transmit the authentication result to the electronic device 100. In operation 629, the electronic device 100 may receive the authentication result. Information such as a valid time (a start time and an end time) of a roaming service product may be included in the authentication result. In operation 631, the electronic device 100 may transmit an access grant request for enabling network access using the second SIM to the roaming server 200. In operation 633, the roaming server 200 may verify the roaming service product, payment and authentication information, and the like and may request the MVNO server 300 to grant the electronic device 100 access to all networks.

If receiving the access grant request in operation 635, in operation 637, the MVNO server 300 may request the MNO network 400 to grant access of the electronic device 100 to all domains. In operation 639, the MNO network 400 may grant access of the electronic device 100 to all networks. Although not illustrated in FIG. 6, the MVNO server 300 may receive a response to the access grant from the MNO network 400 and may transmit a response indicating that the access grant is approved to the electronic device 100 via the roaming server 200. Now, the electronic device 100 may use the roaming service product. In other words, the electronic device 100 may enable the second SIM and may perform network communication based on the second SIM. Meanwhile, the MVNO server 300 may start to count usage (e.g., a use time and an amount of used data) for the roaming service product. In an embodiment, the use time of the roaming service product may be counted by the roaming server 200, and data and/or voice usage of the roaming service product may be counted by the MVNO server 300.

The above-mentioned description may be applied to an embodiment in which a user purchases a roaming service product (a virtual SIM) in advance in a first country and enables the roaming service product after reaching a second country (after a "pay for active" menu is enabled). Additionally or alternatively, the user may purchase a roaming service product in the first country and may perform payment in the first country. In this case, the electronic device 100 may determine its location information and may fail to enable a virtual SIM before the user reaches a second country. If the "pay for active" menu is selected after the user reaches the second country, the electronic device 100 may perform a process from operation 623 of FIG. 6 and may enable the roaming service product.

Further, in an embodiment, the user may arrive in the second country and may purchase a roaming service product of the country. For example, the user may purchase a roaming service product through a roaming application and may enable a virtual SIM, using a free network or a relatively inexpensive network, such as wireless-fidelity (Wi-Fi). In other words, the entire process of FIG. 4 may be performed in the second country. In another embodiment, if the user does not purchase a roaming service product in advance in the first country and if another network such as Wi-Fi is unavailable to him or her, he or she may purchase a roaming service product through a roaming application 111 of FIG. 1 using a roaming service (a roaming service via a first SIM) according to the related art although a relatively expensive fee is charged and may enable a virtual SIM through payment and authentication, thus minimizing generation of cost depending on use of a foreign network.

In an embodiment, a period of time when the user stays abroad may be longer than a period of time when a roaming service product purchased by the user is used. For example, after the user expects to use a roaming service product for 1 week and purchases the roaming service product, he or she may remain abroad for 2 weeks. In this regard, a description will be given of an extension and update method of the roaming service product.

Figure 7:
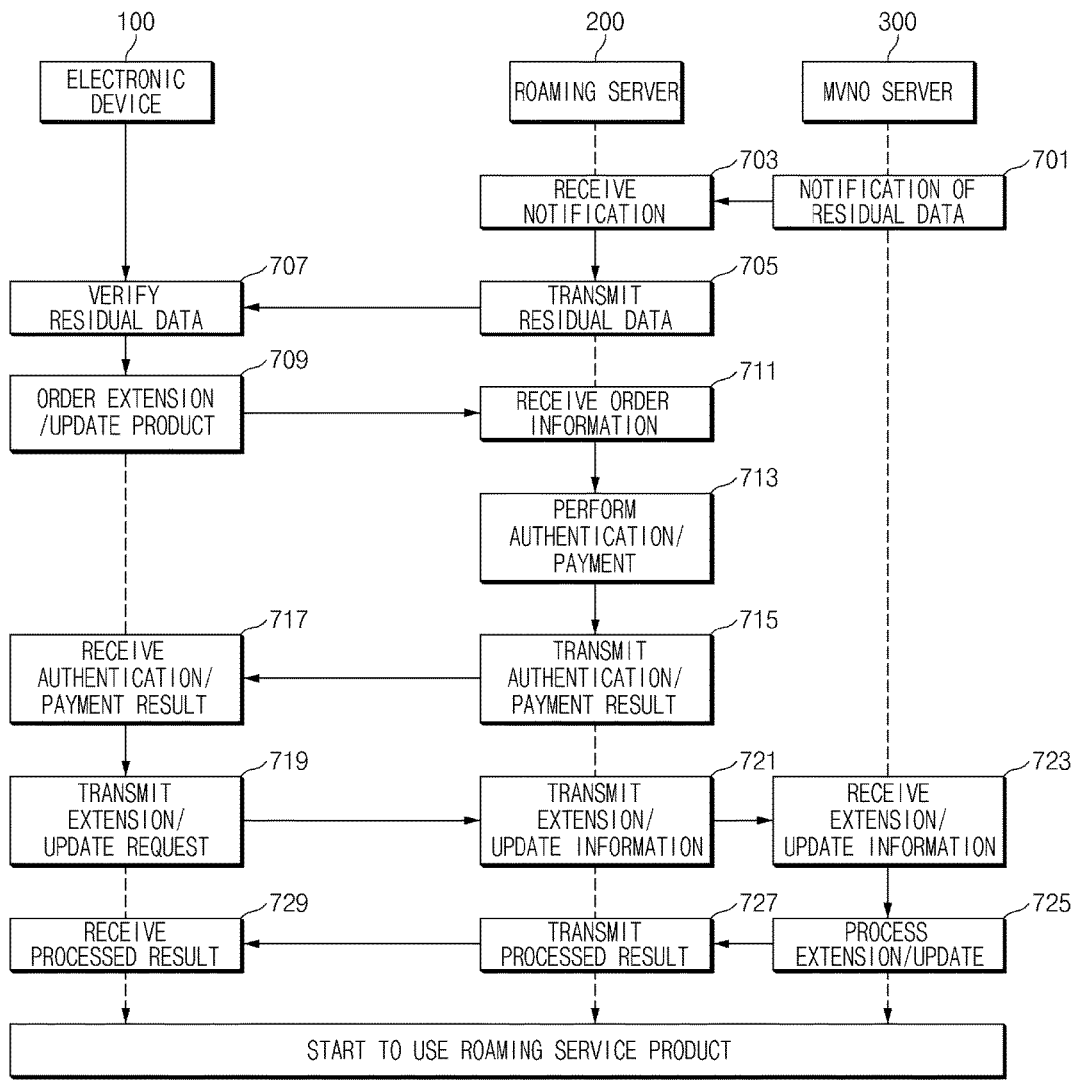
FIG. 7 is a sequence diagram illustrating an example extension and update process of a roaming service product according to an example embodiment.

FIG. 7 is a sequence diagram illustrating an example extension and update process of a roaming service product according to an example embodiment.

Referring to FIG. 7, if a residual amount of data of a roaming service product which is being applied to an electronic device 100 is lowered to a constant level or less, in operation 701, an MVNO server 300 may provide a notification of residual data to a roaming server 200. In operation 703, the roaming server 200 may receive the notification. In operation 705, the roaming server 200 may provide the residual data and a notification that the residual data is reduced to the constant level or less and that it is necessary for extending/updating a roaming service product to the electronic device 100.

In an example of FIG. 7, the extension/update process may be performed relative to the residual data. However, the extension/update process may be performed relative to a residual time. In this case, if a residual time of a roaming service product is lowered to a constant level or less, the roaming server 200 may provide a notification of the residual time to the electronic device 100. However, in an embodiment, the electronic device 100 may continuously receive information about residual data and a residual time from an account/push server 210 of FIG. 1. In this case, if residual data/time is reduced to a constant level or less, a roaming application 111 of FIG. 1 may provide a push notification.

In operation 707, the electronic device 100 may execute the roaming application 111 and may verify the residual data. If it is determined that it is necessary for extending or updating a roaming service product, a user may select an extension or update menu. In this case, in operation 709, the electronic device 100 may transmit an order for an extension/update product to the roaming server 200.

Unlike the process of FIG. 2, the electronic device 100 may already have a virtual SIM and may meet a location condition in the process of FIG. 7. Thus, the electronic device 100 may perform an authentication/payment process concurrently with an order without the necessity of waiting for enabling a "pay for active" menu. For example, information about a roaming service product to be extended/updated, an extension time or an amount of additional data in case of extension, a billing means, information for authentication, and the like may be included in the order information transmitted in operation 709.

In operation 711, the roaming server 200 may receive the order information. In operation 713, the roaming server 200 may perform authentication/payment. In operation 715, the roaming server 200 may transmit the authentication/payment result to the electronic device 100. In operation 717, the electronic device 100 may receive the authentication/payment result. Operations 711 to 717 may correspond to operations 613 to 629 corresponding to a payment and authentication procedure of FIG. 6. Thus, a repeated or similar description will be omitted below. Herein, in some embodiments, the authentication procedure of FIG. 6 may be omitted because it is already accomplished in FIG. 7.

If the authentication and payment is completed, in operation 719, the electronic device 100 may transmit a request to extend/update a roaming service product to the roaming server 200. In operation 721, the roaming server 200 may transmit extension/update information to the MVNO server 300. In operation 723, the MVNO server 300 may receive the extension/update information.

In operation 725, the MVNO server 300 may process extension/update of the roaming service product. For example, the MVNO server 300 may request an MNO network 400 of FIG. 1 to extend a network access time using an IMSI corresponding to the roaming service product or add an amount of available data.

In operation 727, the roaming server 200 may transmit the processed result to the electronic device 100. In operation 729, the electronic device 100 may receive the processed result. Now, the roaming service product may be extended/updated according to ordered details.

Figure 8:
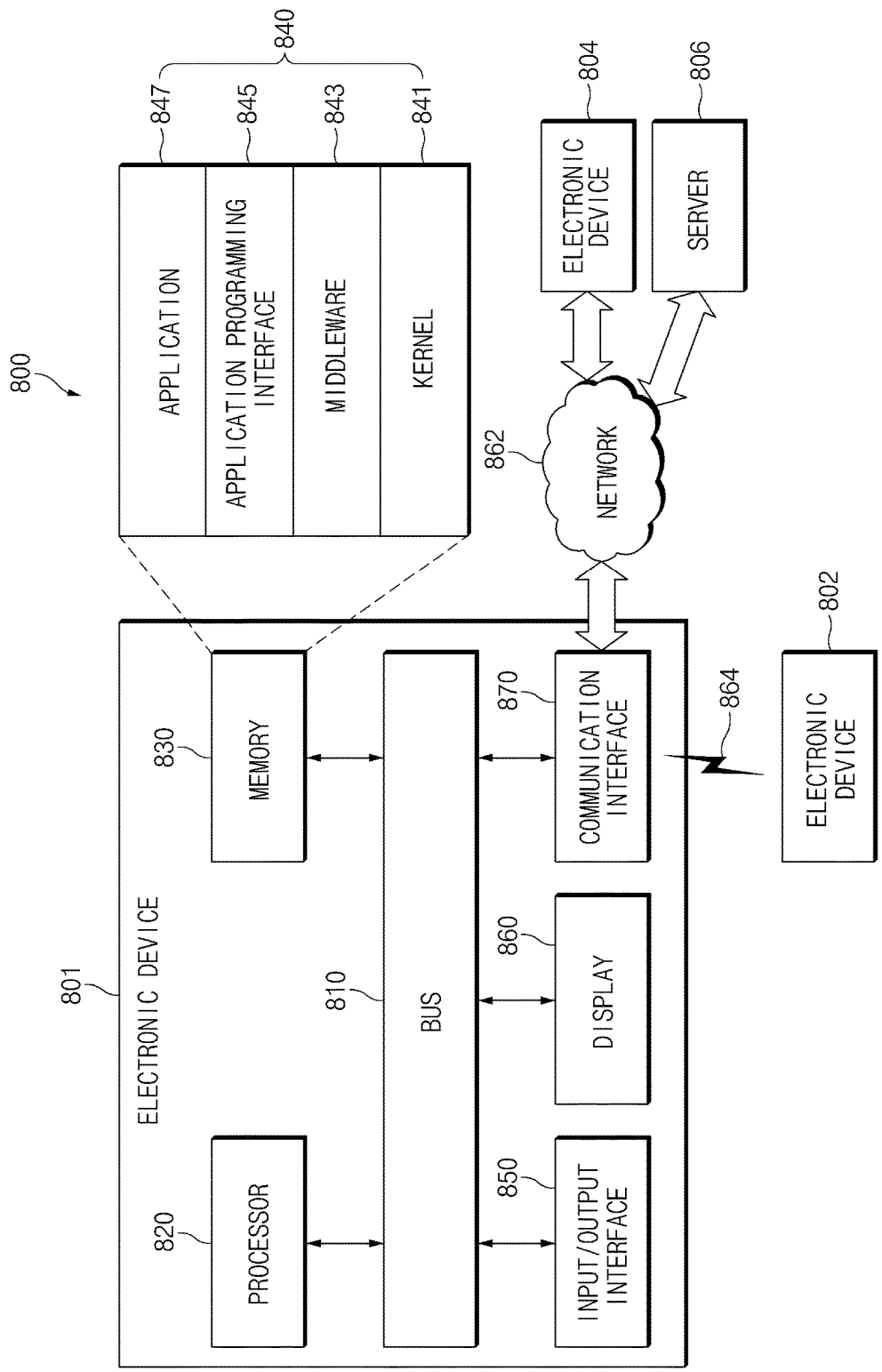
FIG. 8 is a diagram illustrating an example electronic device in a network environment, according to an example embodiment.

FIG. 8 is a diagram illustrating an example electronic device in a network environment system, according to an example embodiment.

Referring to FIG. 8, according to various embodiments, an electronic device 801, a first electronic device 802, a second electronic device 804, or a server 806 may be connected each other over a network 862 or a short range communication 864. The electronic device 801 may include a bus 810, a processor (e.g., including processing circuitry) 820, a memory 830, an input/output interface (e.g., including input/output circuitry) 850, a display 860, and a communication interface (e.g., including communication circuitry) 870. According to an embodiment, the electronic device 801 may not include at least one of the above-described elements or may further include other element(s).

For example, the bus 810 may interconnect the above-described elements 810 to 870 and may include a circuit for conveying communications (e.g., a control message and/or data) among the above-described elements.

The processor 820 may include various processing circuitry, such as, for example, and without limitation, one or more of a dedicated processor, a central processing unit (CPU), an application processor (AP), or a communication processor (CP). For example, the processor 820 may perform an arithmetic operation or data processing associated with control and/or communication of at least other elements of the electronic device 801.

The memory 830 may include a volatile and/or nonvolatile memory. For example, the memory 830 may store instructions or data associated with at least one other element(s) of the electronic device 801. According to an embodiment, the memory 830 may store software and/or a program 840. The program 840 may include, for example, a kernel 841, a middleware 843, an application programming interface (API) 845, and/or an application program (or "an application") 847. At least a part of the kernel 841, the middleware 843, or the API 845 may be referred to as an "operating system (OS)".

For example, the kernel 841 may control or manage system resources (e.g., the bus 810, the processor 820, the memory 830, and the like) that are used to execute operations or functions of other programs (e.g., the middleware 843, the API 845, and the application program 847). Furthermore, the kernel 841 may provide an interface that allows the middleware 843, the API 845, or the application program 847 to access discrete elements of the electronic device 801 so as to control or manage system resources.

The middleware 843 may perform, for example, a mediation role such that the API 845 or the application program 847 communicates with the kernel 841 to exchange data.

Furthermore, the middleware 843 may process task requests received from the application program 847 according to a priority. For example, the middleware 843 may assign the priority, which makes it possible to use a system resource (e.g., the bus 810, the processor 820, the memory 830, or the like) of the electronic device 801, to at least one of the application program 847. For example, the middleware 843 may process the one or more task requests according to the priority assigned to the at least one, which makes it possible to perform scheduling or load balancing on the one or more task requests.

The API 845 may be, for example, an interface through which the application program 847 controls a function provided by the kernel 841 or the middleware 843, and may include, for example, at least one interface or function (e.g., an instruction) for a file control, a window control, image processing, a character control, or the like.

The input/output interface 850 may include various input/output circuitry and play a role, for example, an interface which transmits an instruction or data input from a user or another external device, to other element(s) of the electronic device 801. Furthermore, the input/output interface 850 may output an instruction or data, received from other element(s) of the electronic device 801, to a user or another external device.

The display 860 may include, for example, a liquid crystal display (LCD), a light-emitting diode (LED) display, an organic LED (OLED) display, a microelectromechanical systems (MEMS) display, or an electronic paper display, or the like, but is not limited thereto. The display 860 may display, for example, various contents (e.g., a text, an image, a video, an icon, a symbol, and the like) to a user. The display 860 may include a touch screen and may receive, for example, a touch, gesture, proximity, or hovering input using an electronic pen or a part of a user's body.

For example, the communication interface 870 may establish communication between the electronic device 801 and an external device (e.g., the first electronic device 802, the second electronic device 804, or the server 806). For example, the communication interface 870 may be connected to the network 862 over wireless communication or wired communication to communicate with the external device (e.g., the second electronic device 804 or the server 806). Additionally, the communication interface 870 may establish a short-range wireless communication connection 864 with, for example, the first electronic device 802.

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the short range communication 864. The short range communication 864 may include at least one of wireless fidelity (Wi-Fi), Bluetooth, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 801 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 862 may include at least one of telecommunications networks, for example, a computer network (e.g., LAN or WAN), an Internet, or a telephone network.

Each of the first and second electronic devices 802 and 804 may be a device of which the type is different from or the same as that of the electronic device 801. According to an embodiment, the server 806 may include a group of one or more servers. According to various embodiments, all or a portion of operations that the electronic device 801 will perform may be executed by another or plural electronic devices (e.g., the first electronic device 802, the second electronic device 804 or the server 806). According to an embodiment, in the case where the electronic device 801 executes any function or service automatically or in response to a request, the electronic device 801 may not perform the function or the service internally, but, alternatively additionally, it may request at least a portion of a function associated with the electronic device 801 at other device (e.g., the electronic device 802 or 804 or the server 806). The other electronic device may execute the requested function or additional function and may transmit the execution result to the electronic device 801. The electronic device 801 may provide the requested function or service using the received result or may additionally process the received result to provide the requested function or service. To this end, for example, cloud computing, distributed computing, or client-server computing may be used.

Figure 9:
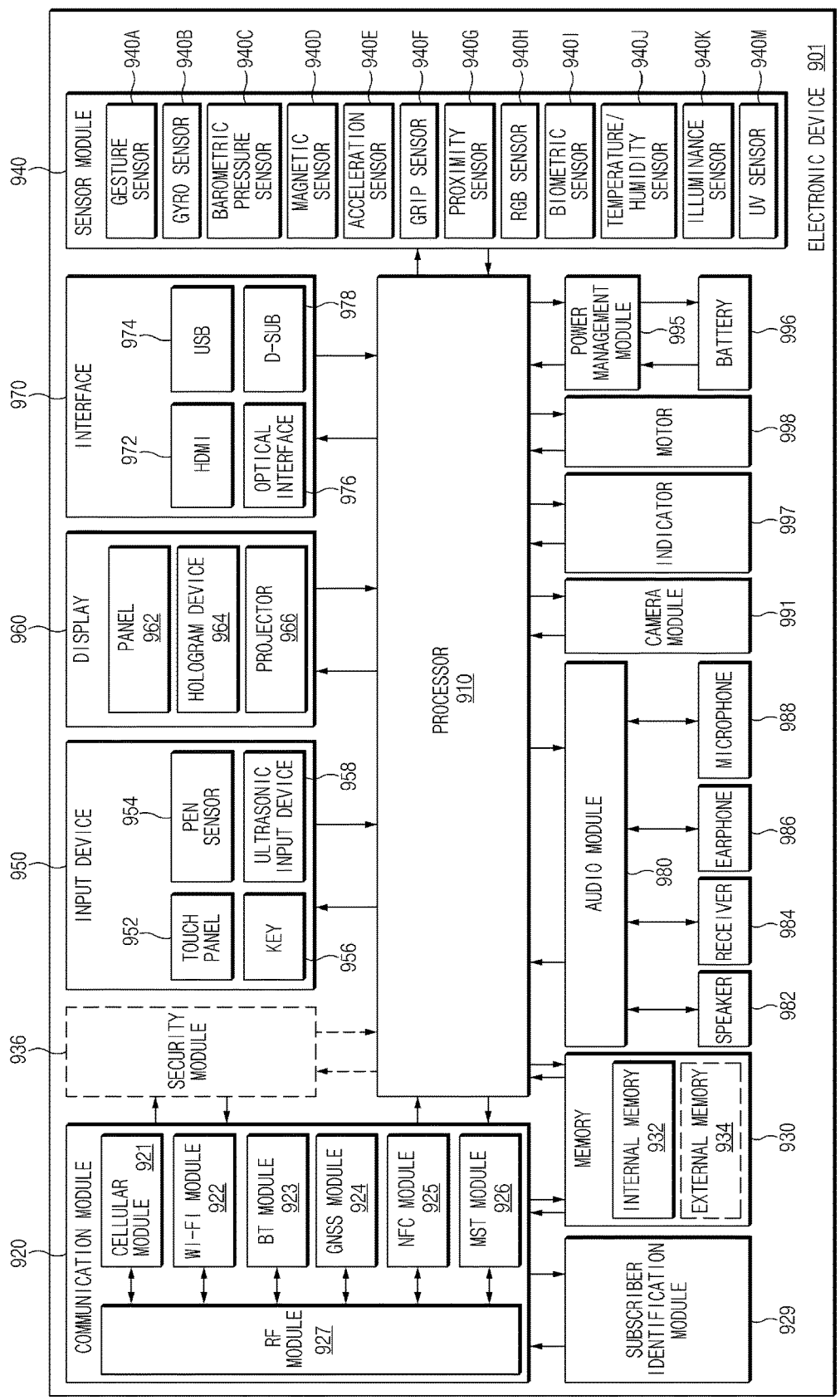
FIG. 9 is a block diagram illustrating an example electronic device, according to an example embodiment.

FIG. 9 is a block diagram illustrating an example electronic device, according to an example embodiment.

Referring to FIG. 9, an electronic device 901 may include, for example, all or a part of the electronic device 801 illustrated in FIG. 8. The electronic device 901 may include one or more processors (e.g., an application processor (AP)) (e.g., including processing circuitry) 910, a communication module (e.g., including communication circuitry) 920, a subscriber identification module 929, a memory 930, a security module 936, a sensor module 940, an input device (e.g., including input circuitry) 950, a display 960, an interface (e.g., including interface circuitry) 970, an audio module 980, a camera module 991, a power management module 995, a battery 996, an indicator 997, and a motor 998.

The processor 910 may include various processing circuitry and drive, for example, an operating system (OS) or an application to control a plurality of hardware or software elements connected to the processor 910 and may process and compute a variety of data. For example, the processor 910 may be implemented with a System on Chip (SoC). According to an embodiment, the processor 910 may further include a graphic processing unit (GPU) and/or an image signal processor. The processor 910 may include at least a part (e.g., a cellular module 921) of elements illustrated in FIG. 9. The processor 910 may load an instruction or data, which is received from at least one of other elements (e.g., a nonvolatile memory), into a volatile memory and process the loaded instruction or data. The processor 910 may store a variety of data in the nonvolatile memory.

The communication module 920 may be configured the same as or similar to the communication interface 870 of FIG. 8. The communication module 920 may include various communication circuitry, such as, for example, and without limitation, the cellular module 921, a Wi-Fi module 922, a Bluetooth (BT) module 923, a GNSS module 924 (e.g., a GPS module, a Glonass module, a Beidou module, or a Galileo module), a near field communication (NFC) module 925, a MST module 926 and a radio frequency (RF) module 927.

The cellular module 921 may provide, for example, voice communication, video communication, a character service, an Internet service, or the like over a communication network. According to an embodiment, the cellular module 921 may perform discrimination and authentication of the electronic device 901 within a communication network by using the subscriber identification module (e.g., a SIM card) 929. According to an embodiment, the cellular module 921 may perform at least a portion of functions that the processor 910 provides. According to an embodiment, the cellular module 921 may include a communication processor (CP).

Each of the Wi-Fi module 922, the BT module 923, the GNSS module 924, the NFC module 925, or the MST module 926 may include a processor for processing data exchanged through a corresponding module, for example. According to an embodiment, at least a part (e.g., two or more) of the cellular module 921, the Wi-Fi module 922, the BT module 923, the GNSS module 924, the NFC module 925, or the MST module 926 may be included within one Integrated Circuit (IC) or an IC package.

For example, the RF module 927 may transmit and receive a communication signal (e.g., an RF signal). For example, the RF module 927 may include a transceiver, a power amplifier module (PAM), a frequency filter, a low noise amplifier (LNA), an antenna, or the like. According to another embodiment, at least one of the cellular module 921, the Wi-Fi module 922, the BT module 923, the GNSS module 924, the NFC module 925, or the MST module 926 may transmit and receive an RF signal through a separate RF module.

The subscriber identification module 929 may include, for example, a card and/or embedded SIM that includes a subscriber identification module and may include unique identify information (e.g., integrated circuit card identifier (ICCID)) or subscriber information (e.g., integrated mobile subscriber identity (IMSI)).

The memory 930 (e.g., the memory 830) may include an internal memory 932 and/or an external memory 934. For example, the internal memory 932 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 934 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 934 may be operatively and/or physically connected to the electronic device 901 through various interfaces.

A security module 936 may be a module that includes a storage space of which a security level is higher than that of the memory 930 and may be a circuit that guarantees safe data storage and a protected execution environment. The security module 936 may be implemented with a separate circuit and may include a separate processor. For example, the security module 936 may be in a smart chip or a secure digital (SD) card, which is removable, or may include an embedded secure element (eSE) embedded in a fixed chip of the electronic device 901. Furthermore, the security module 936 may operate based on an operating system (OS) that is different from the OS of the electronic device 901. For example, the security module 936 may operate based on java card open platform (JCOP) OS.

The sensor module 940 may measure, for example, a physical quantity or may detect an operation state of the electronic device 901. The sensor module 940 may convert the measured or detected information to an electrical signal. For example, the sensor module 940 may include at least one of a gesture sensor 940A, a gyro sensor 940B, a barometric pressure sensor 940C, a magnetic sensor 940D, an acceleration sensor 940E, a grip sensor 940F, the proximity sensor 940G, a color sensor 940H (e.g., red, green, blue (RGB) sensor), a biometric sensor 940I, a temperature/humidity sensor 940J, an illuminance sensor 940K, or an UV sensor 940M. Although not illustrated, additionally or generally, the sensor module 940 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 940 may further include a control circuit for controlling at least one or more sensors included therein. According to an embodiment, the electronic device 901 may further include a processor that is a part of the processor 910 or independent of the processor 910 and is configured to control the sensor module 940. The processor may control the sensor module 940 while the processor 910 remains at a sleep state.

The input device 950 may include various input circuitry, such as, for example, and without limitation, a touch panel 952, a (digital) pen sensor 954, a key 956, or an ultrasonic input unit 958. For example, the touch panel 952 may use at least one of capacitive, resistive, infrared and ultrasonic detecting methods. Also, the touch panel 952 may further include a control circuit. The touch panel 952 may further include a tactile layer to provide a tactile reaction to a user.

The (digital) pen sensor 954 may be, for example, a part of a touch panel or may include an additional sheet for recognition. The key 956 may include, for example, a physical button, an optical key, a keypad, or the like. The ultrasonic input device 958 may detect (or sense) an ultrasonic signal, which is generated from an input device, through a microphone (e.g., a microphone 988) and may check data corresponding to the detected ultrasonic signal.

The display 960 (e.g., the display 860) may include a panel 962, a hologram device 964, or a projector 966. The panel 962 may be the same as or similar to the display 860 illustrated in FIG. 8. The panel 962 may be implemented, for example, to be flexible, transparent or wearable. The panel 962 and the touch panel 952 may be integrated into a single module. The hologram device 964 may display a stereoscopic image in a space using a light interference phenomenon. The projector 966 may project light onto a screen so as to display an image. For example, the screen may be arranged in the inside or the outside of the electronic device 901. According to an embodiment, the display 960 may further include a control circuit for controlling the panel 962, the hologram device 964, or the projector 966.

The interface 970 may include various interface circuitry, such as, for example, and without limitation, a high-definition multimedia interface (HDMI) 972, a universal serial bus (USB) 974, an optical interface 976, or a D-subminiature (D-sub) 978. The interface 970 may be included, for example, in the communication interface 870 illustrated in FIG. 8. Additionally or generally, the interface 970 may include, for example, a mobile high definition link (MI-IL) interface, a SD card/multi-media card (MMC) interface, or an infrared data association (IrDA) standard interface.

The audio module 980 may convert a sound and an electric signal in dual directions. At least a part of the audio module 980 may be included, for example, in the input/output interface 850 illustrated in FIG. 8. The audio module 980 may process, for example, sound information that is input or output through a speaker 982, a receiver 984, an earphone 986, or the microphone 988.

For example, the camera module 991 may shoot a still image or a video. According to an embodiment, the camera module 991 may include at least one or more image sensors (e.g., a front sensor or a rear sensor), a lens, an image signal processor (ISP), or a flash (e.g., an LED or a xenon lamp).

The power management module 995 may manage, for example, power of the electronic device 901. According to an embodiment, a power management integrated circuit (PMIC), a charger IC, or a battery or fuel gauge may be included in the power management module 995. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 996 and a voltage, current or temperature thereof while the battery is charged. The battery 996 may include, for example, a rechargeable battery and/or a solar battery.

The indicator 997 may display a specific state of the electronic device 901 or a part thereof (e.g., the processor 910), such as a booting state, a message state, a charging state, and the like. The motor 998 may convert an electrical signal into a mechanical vibration and may generate the following effects: vibration, haptic, and the like. Although not illustrated, a processing device (e.g., a GPU) for supporting a mobile TV may be included in the electronic device 901. The processing device for supporting the mobile TV may process media data according to the standards of digital multimedia broadcasting (DMB), digital video broadcasting (DVB), MediaFlo™, or the like.

Each of the above-mentioned elements of the electronic device according to various embodiments of the present disclosure may be configured with one or more components, and the names of the elements may be changed according to the type of the electronic device. In various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 10:
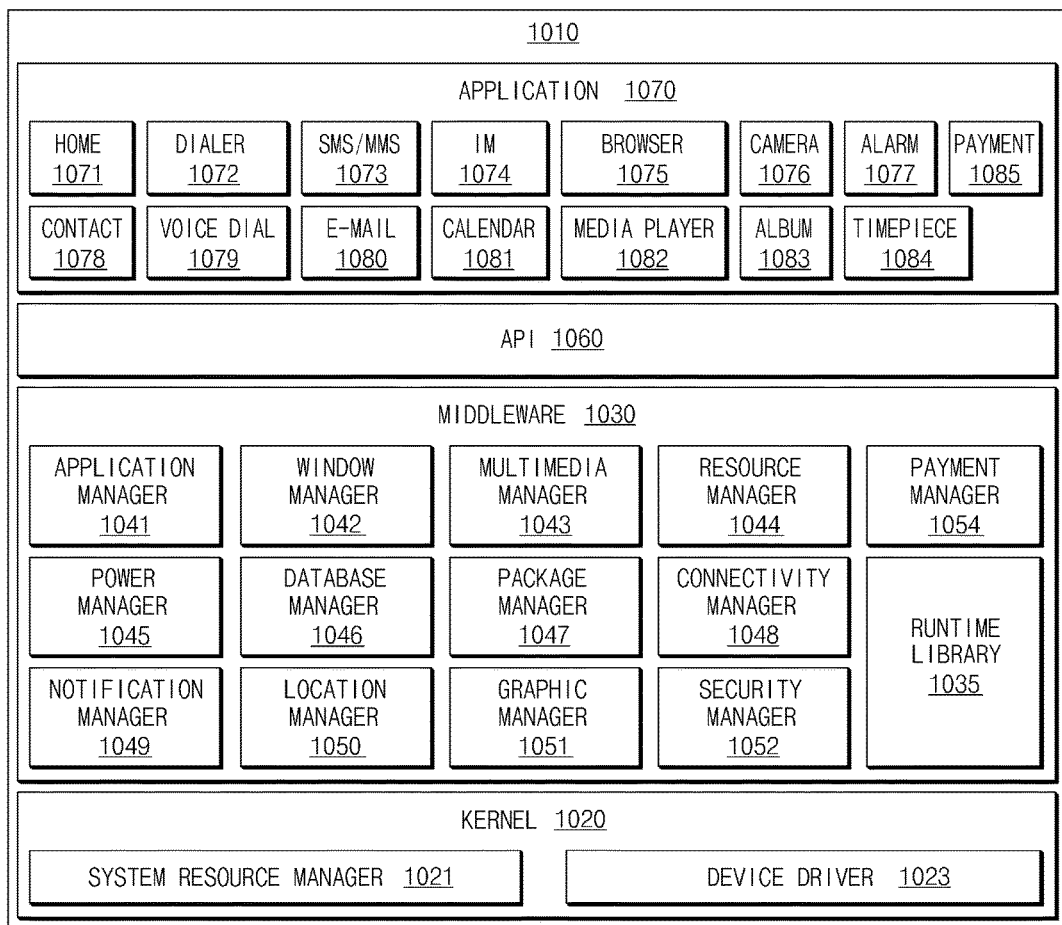
FIG. 10 is a block diagram illustrating an example program module, according to an example embodiment.

FIG. 10 is a block diagram illustrating an example program module, according to various example embodiments.

According to an embodiment, a program module 1010 (e.g., the program 840) may include an operating system (OS) to control resources associated with an electronic device (e.g., the electronic device 801), and/or diverse applications (e.g., the application program 847) driven on the OS. The OS may be, for example, Android, iOS, Windows, Symbian, or Tizen.

The program module 1010 may include a kernel 1020, a middleware 1030, an application programming interface (API) 1060, and/or an application 1070. At least a portion of the program module 1010 may be preloaded on an electronic device or may be downloadable from an external electronic device (e.g., the first electronic device 802, the second electronic device 804, the server 806, or the like).

The kernel 1020 (e.g., the kernel 841) may include, for example, a system resource manager 1021 or a device driver 1023. The system resource manager 1021 may perform control, allocation, or retrieval of system resources. According to an embodiment, the system resource manager 1021 may include a process managing unit, a memory managing unit, or a file system managing unit. The device driver 1023 may include, for example, a display driver, a camera driver, a Bluetooth driver, a shared memory driver, a USB driver, a keypad driver, a Wi-Fi driver, an audio driver, or an inter-process communication (IPC) driver.

The middleware 1030 may provide, for example, a function that the application 1070 needs in common, or may provide diverse functions to the application 1070 through the API 1060 to allow the application 1070 to efficiently use limited system resources of the electronic device. According to an embodiment, the middleware 1030 (e.g., the middleware 843) may include at least one of a runtime library 1035, an application manager 1041, a window manager 1042, a multimedia manager 1043, a resource manager 1044, a power manager 1045, a database manager 1046, a package manager 1047, a connectivity manager 1048, a notification manager 1049, a location manager 1050, a graphic manager 1051, a security manager 1052, or a payment manager 1054.

The runtime library 1035 may include, for example, a library module that is used by a compiler to add a new function through a programming language while the application 1070 is being executed. The runtime library 1035 may perform input/output management, memory management, or capacities about arithmetic functions.

The application manager 1041 may manage, for example, a life cycle of at least one application of the application 1070. The window manager 1042 may manage a graphic user interface (GUI) resource that is used in a screen. The multimedia manager 1043 may identify a format necessary for playing diverse media files, and may perform encoding or decoding of media files by using a codec suitable for the format. The resource manager 1044 may manage resources such as a storage space, memory, or source code of at least one application of the application 1070.

The power manager 1045 may operate, for example, with a basic input/output system (BIOS) to manage a battery or power, and may provide power information for an operation of an electronic device. The database manager 1046 may generate, search for, or modify database that is to be used in at least one application of the application 1070. The package manager 1047 may install or update an application that is distributed in the form of package file.

The connectivity manager 1048 may manage, for example, wireless connection such as Wi-Fi or Bluetooth. The notification manager 1049 may display or notify an event such as arrival message, appointment, or proximity notification in a mode that does not disturb a user. The location manager 1050 may manage location information about an electronic device. The graphic manager 1051 may manage a graphic effect that is provided to a user, or manage a user interface relevant thereto. The security manager 1052 may provide a general security function necessary for system security, user authentication, or the like. According to an embodiment, in the case where an electronic device (e.g., the electronic device 801) includes a telephony function, the middleware 1030 may further include a telephony manager for managing a voice or video call function of the electronic device.

The middleware 1030 may include a middleware module that combines diverse functions of the above-described elements. The middleware 1030 may provide a module specialized to each OS kind to provide differentiated functions. Additionally, the middleware 1030 may dynamically remove a part of the preexisting elements or may add new elements thereto.

The API 1060 (e.g., the API 845) may be, for example, a set of programming functions and may be provided with a configuration that is variable depending on an OS. For example, in the case where an OS is the android or the iOS, it may provide one API set per platform. In the case where an OS is the tizen, it may provide two or more API sets per platform.

The application 1070 (e.g., the application program 847) may include, for example, one or more applications capable of providing functions for a home 1071, a dialer 1072, an SMS/MMS 1073, an instant message (IM) 1074, a browser 1075, a camera 1076, an alarm 1077, a contact 1078, a voice dial 1079, an e-mail 1080, a calendar 1081, a media player 1082, an album 1083, a timepiece 1084, a payment 1085. Additionally, or alternatively, though not shown, the application 1070 may include health care (e.g., measuring an exercise quantity, blood sugar, or the like), or offering of environment information (e.g., information of barometric pressure, humidity, temperature, or the like).

According to an embodiment, the application 1070 may include an application (hereinafter referred to as "information exchanging application" for descriptive convenience) to support information exchange between an electronic device (e.g., the electronic device 801) and an external electronic device (e.g., the first electronic device 802 or the second electronic device 804). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the information exchanging application may receive, for example, notification information from an external electronic device and provide the notification information to a user.

The device management application may manage (e.g., install, delete, or update), for example, at least one function (e.g., turn-on/turn-off of an external electronic device itself (or a part of elements) or adjustment of brightness (or resolution) of a display) of the external electronic device which communicates with the electronic device, an application running in the external electronic device, or a service (e.g., a call service, a message service, or the like) provided from the external electronic device.

According to an embodiment, the application 1070 may include an application (e.g., a health care application of a mobile medical device) that is assigned in accordance with an attribute of an external electronic device. According to an embodiment, the application 1070 may include an application that is received from an external electronic device (e.g., the first electronic device 802, the second electronic device 804, or the server 806). According to an embodiment, the application 1070 may include a preloaded application or a third party application that is downloadable from a server. The names of elements of the program module 1010 according to the embodiment may be modifiable depending on kinds of operating systems.

According to various embodiments, at least a portion of the program module 1010 may be implemented by software, firmware, hardware, or a combination of two or more thereof. At least a portion of the program module 1010 may be implemented (e.g., executed), for example, by the processor (e.g., the processor 910). At least a portion of the program module 1010 may include, for example, modules, programs, routines, sets of instructions, processes, or the like for performing one or more functions.

The term "module" used in this disclosure may refer, for example, to a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include, for example, and without limitation, at least one of a dedicated processor, a CPU, an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 820), may cause the one or more processors to perform a function corresponding to the instruction. The computer-readable storage media, for example, may be the memory 830.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation of various embodiments of the present disclosure, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

According to embodiments disclosed in the present disclosure, the user may purchase a roaming service product using a roaming application of the electronic device. Thus, the cost of using a roaming service may be saved, and the inconvenience where the user should purchase a pre-paid SIM locally may be addressed.

Further, the user may verify a residual roaming service time, an amount of residual roaming data, and the like in real time. Thus, a plan to use data, a plan to extend a roaming service product, or the like may be effectively established.

In addition, a variety of effects directly or indirectly ascertained through the present disclosure may be provided.

While the present disclosure has been illustrated and described with reference to various example embodiments thereof, it will be understood by those skilled in the art that various changes in form and details may be made therein without departing from the spirit and scope of the present disclosure as defined by the appended claims and their equivalents.

What is claimed is:

1. An electronic device, comprising:
a processor configured to execute a roaming application;
a communication circuit configured to enable a first subscriber identity module (SIM) and to communicate with a network based on the first SIM and to communicate with a plurality of networks based on a third SIM which provides a network service different from the first SIM and a second SIM; and
a memory configured to store data associated with the roaming application,
wherein the processor is further configured to:
download the second SIM corresponding to the roaming service product from a server when a roaming service product is selected in the roaming application, wherein the first SIM is a SIM card and the second SIM is a virtual SIM to be stored in memory of the electronic device after the download;
enable an activation menu of the roaming service product included in the roaming application, based on a mobile country code (MCC) obtained by a network search being identical to an MCC included in the second SIM;
allow the communication circuit to enable the second SIM if purchase of the roaming service product through the enabled activation menu is completed;
allow both the first SIM and the second SIM to be active simultaneously for different functions, so as to allow performance of a voice call based on the first SIM and data communication based on the second SIM;
provide a selection screen for the first SIM and the third SIM;
control to disable a SIM selected between the first SIM and the third SIM and to enable the second SIM;
receive information about at least one of a residual time and residual data usage of the roaming service product from at least one server; and
provide a menu for updating or extending the roaming service product in the roaming application if one or more of the residual time or the residual data usage meets a predetermined condition.

2. The electronic device of claim 1, wherein the communication circuit further comprises a global positioning system (GPS) signal receiving circuit, and
wherein the processor is configured to:
determine location information of the electronic device based on a GPS signal received via the GPS signal receiving circuit; and
enable the activation menu if the location information corresponds to an MCC included in the second SIM.

3. The electronic device of claim 1, wherein the processor is configured to:
store the second SIM in a secure area of the memory.

4. The electronic device of claim 1, wherein the communication circuit is configured to:
perform the purchase of the roaming service product and authentication of the second SIM by communicating with at least one server previously registered in a whitelist; and
enable the second SIM if the authentication of the second SIM is completed.

5. The electronic device of claim 1, wherein the processor is configured to:
provide a notification that the roaming service product expires if one or more of the residual time or the residual data usage meets a predetermined condition.

6. The electronic device of claim 1, wherein the processor is configured to: propose the roaming service product based on schedule information.

7. The electronic device of claim 1, wherein the processor is configured to: delete the second SIM if the second SIM is not enabled for a predetermined time.

* * * * *